United States Patent [19]
Brady et al.

[11] Patent Number: 5,784,698
[45] Date of Patent: Jul. 21, 1998

[54] DYNAMIC MEMORY ALLOCATION THAT ENALBES EFFICIENT USE OF BUFFER POOL MEMORY SEGMENTS

[75] Inventors: James Thomas Brady; Damon W. Finney, both of San Jose, Calif.; Michael Howard Hartung, Tucson, Ariz.; Michael Anthony Ko, San Jose, Calif.; Noah R. Mendelsohn, Lexington, Mass.; Jaishankar Moothedath Menon, San Jose; David R. Nowlen, Morgan Hill, both of Calif.

[73] Assignee: International Business Machines Corporation, Armonk, N.Y.

[21] Appl. No.: 568,180

[22] Filed: Dec. 5, 1995

[51] Int. Cl.$^6$ .................................... G06F 12/02
[52] U.S. Cl. ............ 711/171; 711/170; 711/159; 711/165; 395/672; 395/673; 395/876
[58] Field of Search ..................... 711/170, 171, 711/172, 154, 165, 159; 395/672, 673, 876

[56] References Cited

U.S. PATENT DOCUMENTS

| | | | |
|---|---|---|---|
| 4,158,235 | 6/1979 | Call et al. | 395/876 |
| 4,493,020 | 1/1985 | Kim et al. | 395/393 |
| 4,511,964 | 4/1985 | Georg et al. | 395/412 |
| 4,528,624 | 7/1985 | Kamionka et al. | 395/674 |
| 4,603,382 | 7/1986 | Cole et al. | 395/250 |
| 5,093,912 | 3/1992 | Dong et al. | 395/674 |
| 5,103,393 | 4/1992 | Harris et al. | 395/200.03 |
| 5,247,634 | 9/1993 | Cline et al. | 395/621 |
| 5,289,470 | 2/1994 | Chang et al. | 370/429 |
| 5,339,411 | 8/1994 | Heaton, Jr. | 711/171 |
| 5,404,511 | 4/1995 | Notarianni | 395/601 |
| 5,420,999 | 5/1995 | Mundy | 711/173 |
| 5,623,654 | 4/1997 | Peterman | 395/622 |

OTHER PUBLICATIONS

Programming Project —'Safe Storage Allocation'— Jonathan Amsterdam —Oct. 1986 (pp. 123–132).
IBM Technical Disclosure Bulletin —vol. 33, No. 8 —E. S. Bender —Jan. 1991. (pp. 474–479).

Primary Examiner—Eddie P. Chan
Assistant Examiner—Hong C. Kim
Attorney, Agent, or Firm—Ohlandt, Greeley, Ruggiero & Perle

[57] ABSTRACT

An apparatus for dynamically allocating memory includes a processor, a free buffer pool memory and a control memory which stores control block data structures. The control block data structures enable a segmentation of the free buffer pool memory into a series of free buffer pools, each free buffer pool comprising plural identical size buffers, each succeeding free buffer pool including a larger buffer size than a preceding free buffer pool. A selection size parameter for a given free buffer pool is a value that is larger than the buffer size comprising the given free buffer pool, but less than a next larger buffer size in the next of the series of free buffer pools. A memory allocation procedure responds to a request from an executing procedure for allocation of buffer space by: (i) allocating a buffer from a free buffer pool memory whose associated selection size parameter is a next larger value than the buffer space that was requested; (ii) determining a difference between the allocated buffer size and the requested buffer space to find an unfulfilled amount of the requested buffer space; (iii) allocating a buffer from a free buffer pool memory whose selection size parameter is a next larger value, among selection size parameters, than the unfulfilled amount; and (iv) repeating ii and iii until the memory allocation procedure determines that there is no unfulfilled amount of the requested buffer space. The apparatus further includes "quickcell" memory which is allocated without use of control block data structures.

11 Claims, 3 Drawing Sheets

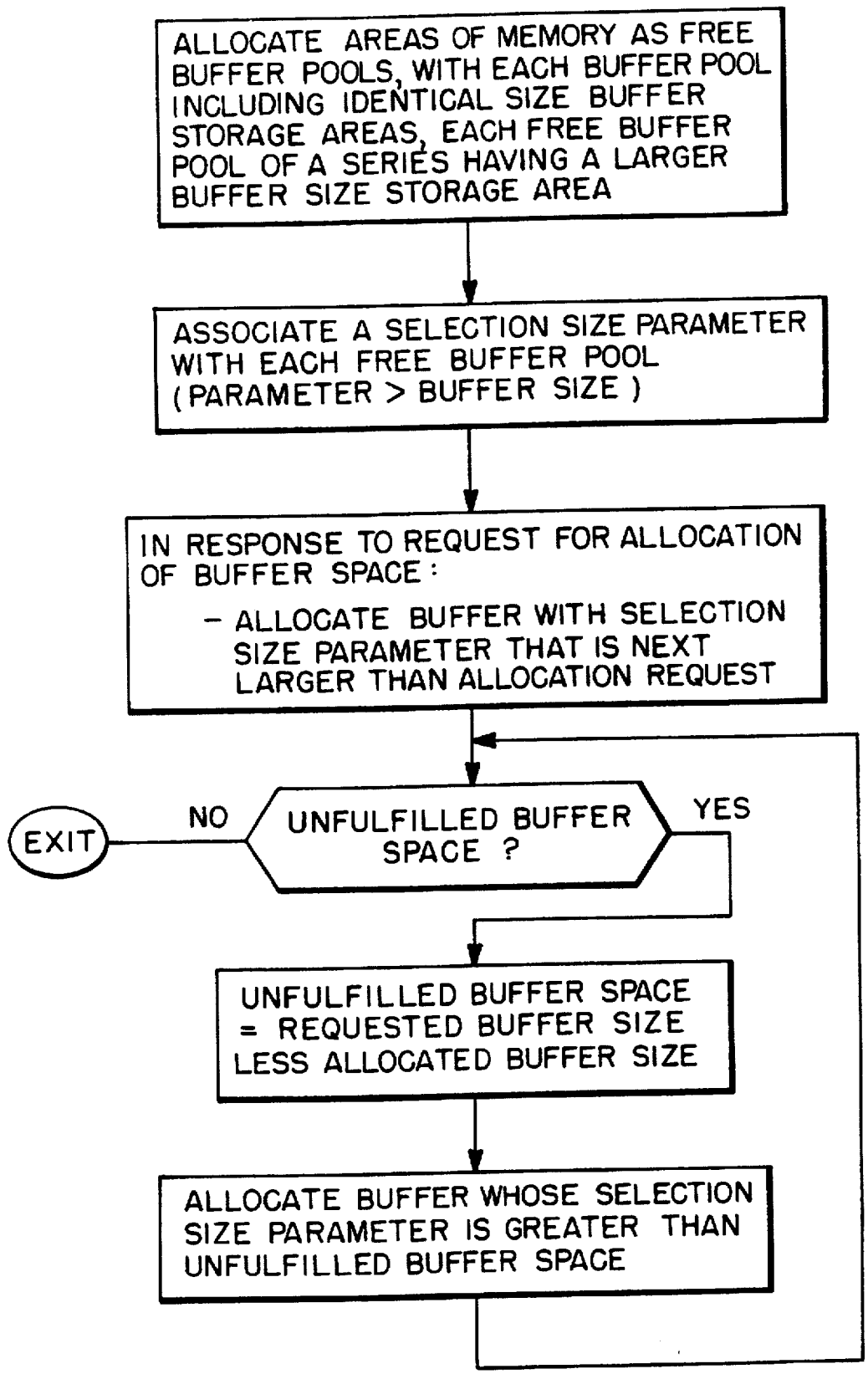

DYNAMIC MEMORY ALLOCATION THAT ENALBES EFFICIENT USE OF BUFFER POOL MEMORY SEGMENTS

FIELD OF THE INVENTION

This invention relates to a method and system for allocating memory resources in response to procedure-generated calls for memory and, more particularly, to a dynamic memory allocation procedure which operates both efficiently and with minimal impact on system performance.

BACKGROUND OF THE INVENTION

Substantially, all data processing systems require allocation and de-allocation of resources within the system. A principal objective in carrying out allocation/de-allocation procedures is to minimize their impact on overall system performance. The prior art includes a number of teachings regarding such procedures. In U.S. Pat. No. 4,511,964 to Georg, et al., physical memory is dynamically mapped (i.e., partitioned) so as to enable independent programming environments to be stored without interfering with each other's operation. Harris, et al., in U.S. Pat. No. 5,103,393, dynamically allocate processors in a massively parallel processing system to enable various ones of the processors to be applied to a particular procedure.

In U.S. Pat. No. 4,493,020, Kim, et al. describe a procedure for dynamic resource allocation which employs a plurality of dynamically allocatable registers whose free and use states are continuously monitored by an allocation register. Outputs from the allocation register are used to identify a particular group of free registers which are available for assignment to a new task.

Cole, et al. in U.S. Pat. No. 4,603,382, describe a procedure for dynamically re-allocating data buffer storage segments. The procedure employs an elapsed time period metric. When a number of accesses to a data storage device reaches a threshold, the need for dynamic re-allocation is examined. The elapsed time metric enables the system to monitor which of various allocated buffer segments have data transfer activity and to measure the intensity of that activity for the respective buffer segments. Based upon an allocation status of the buffer segments and intensity of activities of the respective buffer segments, buffers are selectively re-allocated to various data storage devices.

Kamionka, et al. in U.S. Pat. No. 4,528,624 describe a method for allocation of space on peripheral storage devices to various host processes. Such allocation is based upon free or unallocated space, with the device having the largest free space being most likely to receive a next space allocation requirement. A central record in the host processor stores free space indications and handles the allocation procedure.

Memory is often divided into buffer segments of various sizes, with the buffer segments being allocated via dynamic call procedures. Cline, et al., in U.S. Pat. No. 5,247,634, initially divide memory into a plurality of free memory blocks. An allocated memory block and the free memory blocks are associated in a tree structure so that subsequent requests for memory allocation can find the free memory space. In U.S. Pat. No. 4,158,235 to Call, et al., a buffer pool system is described which includes a plurality of small buffer blocks which are available for allocation to a plurality of input/output data paths. Each buffer block is a fixed size and is associatively addressed.

Dong, et al. (U.S. Pat. No. 5,093,912) describes a method for expanding and contracting a resource pool of buffer blocks on a dynamic basis. The overall pool of available buffers is expanded by creating an extension pool and adding its resources to the master pool. A further technique is described for contracting the pool when its resources are no longer required.

Various procedures exist in the prior art which attempt to minimize "leftover" memory during a buffer allocation procedure. For instance, Bender in I.B.M. Technical Disclosure Bulletin, Vol. 33, No. 8, January 1991, pp. 474–479, describes an allocation procedure which employs a "first fit" mechanism. That mechanism consists of searching a doubly-linked list of free buffer blocks that are arranged in ascending address order. The first free block encountered of sufficient size that satisfies the allocation request is used. The storage requested is taken from the free block and any storage remaining is re-integrated back into the free chain.

Various other buffer allocation procedures are described by Amsterdam in "Safe Storage Allocation," Byte, October 1986, pp. 123–132. Amsterdam indicates various possible strategies for choosing blocks of buffer storage. A best-fit strategy is described wherein an allocation procedure searches a list of free buffers, from beginning to end, and chooses a buffer whose size comes closest to the request, without being too small. The best-fit strategy can result in "fragmentation" of remaining memory resources. If the chosen buffers are often slightly larger than the request, then many small blocks are left on the free buffer list. The allocation procedure may then be unable to satisfy a request, not because there isn't enough storage available, but because the storage is distributed among many different buffer blocks, each of which is too small. Amsterdam describes various approaches to re-allocating fragmented portions to enable them to be accessed by the allocation procedure.

It is an object of this invention to provide a dynamic memory allocation system and procedure which operates with minimal impact on system performance.

It is another object of this invention to provide a method and system for dynamic memory allocation which reduces the amount of fragmented memory remaining after allocation.

SUMMARY OF THE INVENTION

An apparatus for dynamically allocating memory includes a processor, a free buffer pool memory and a control memory which stores control block data structures. The control block data structures enable a segmentation of the free buffer pool memory into a series of free buffer pools, each free buffer pool comprising plural identical size (called "buffer size") buffers, each succeeding free buffer pool of the series including a larger buffer size than a preceding free buffer pool of the series. A further memory stores a selection size parameter in association with each free buffer pool. The selection size parameter for a given free buffer pool is a value that is larger than the buffer size comprising the given free buffer pool, but less than a next larger buffer size in the next of the series of free buffer pools. A memory allocation procedure responds to a request from an executing procedure for allocation of buffer space by: (i) allocating a buffer from a free buffer pool whose associated selection size parameter is a next larger value, among selection size parameters, than the buffer space that was requested; (ii) determining a difference between the allocated buffer size and the requested buffer space, to find an unfulfilled amount of the requested buffer space; (iii) allocating a buffer from a free buffer pool in the free buffer pool memory whose selection size parameter is a next larger value, among selection size parameters, than the unfulfilled amount; and (iv) repeating ii and iii until the memory allocation procedure determines that there is no unfulfilled amount of the requested buffer space. The apparatus further includes "quickcell" memory which is allocated without use of control block data structures.

BRIEF DESCRIPTION OF THE DRAWINGS

FIG. 4 is a logical flow diagram illustrating the method of the invention.

DETAILED DESCRIPTION OF THE INVENTION

In the prior art, when an executing procedure initiates a request for a memory allocation, a software-based allocation procedure executes an interrupt to the operating system which then handles the allocation on an exception basis. This action is both time consuming and delays completion of the task being executed. The invention avoids such drawbacks by implementing a memory allocation system essentially in hardware. It initially presegregates all memory that is to be allocated into free buffer pools. Each free buffer pool comprises plural buffers of an identical buffer size. Each buffer has an associated buffer control block (BCB) which defines parameters of the buffer and includes a pointer to a next buffer in the respective free buffer pool.

Buffer allocation is accomplished by implementation of a "get BCB" Order which enables the system to access a next BCB from a linked list of BCB's. To return a buffer to a free buffer pool, a "free BCB" Order enables the buffer to be released back into the free buffer pool. The invention employs a "Selection size" parameter which assures a highly efficient allocation of memory space in response to a request.

Figure 1:
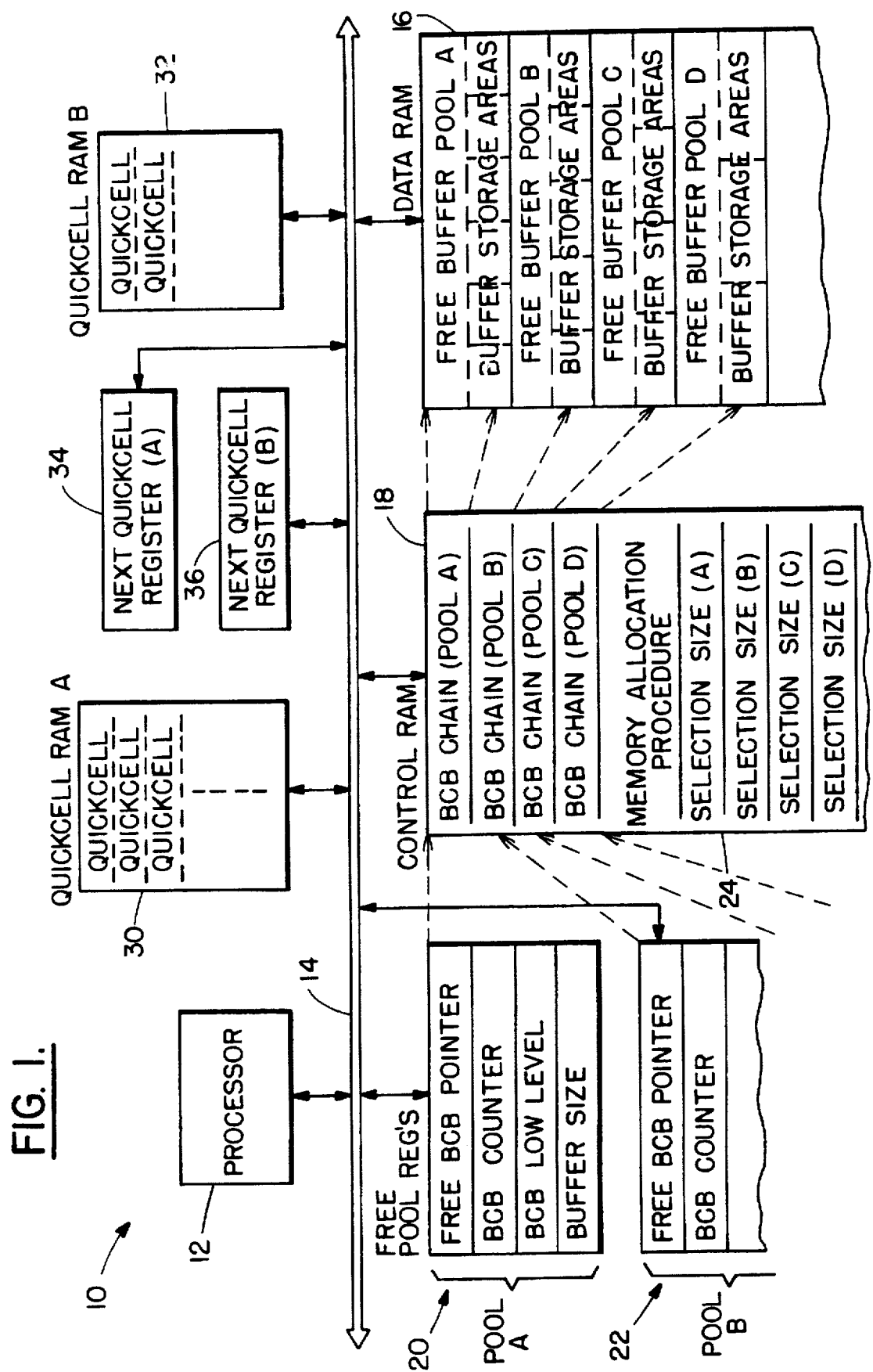
FIG. 1 is a block diagram of a system which embodies the invention.

Referring first to FIG. 1, computing system 10 includes a processor 12 which communicates with other elements of system 10 via a bus structure 14. A random access memory (RAM) 16 (for data) comprises an area of storage which is segregated into a plurality of free buffer pools A, B, C, D, etc. Each free buffer pool is of a size to accommodate a plurality of buffers of identical size. Each free buffer pool, however, comprises a set of buffers that differs in size from buffers in other free buffer pools. For example, free buffer pool A may include 64 byte buffers; free buffer pool B may include 128 byte buffers; free buffer pool C, 256 byte buffers; and free buffer pool D, 512 byte buffers, etc. . . . It is to be understood, that the aforesaid buffer sizes are given only for exemplary purposes and that other buffer sizes are within the contemplation of the invention.

Figure 2:
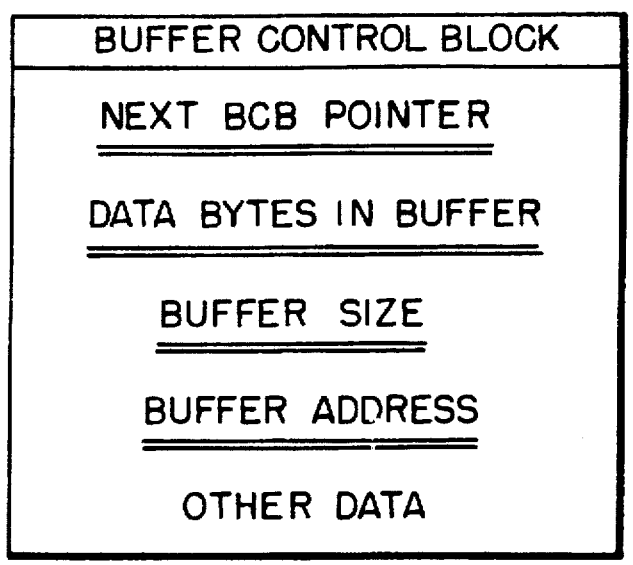
FIG. 2 is a diagram illustrating a buffer control block data structure.

Each buffer in each free buffer pool has an associated BCB data structure, such as shown in FIG. 2. A BCB includes the following fields:

1. Next BCB pointer: A group of BCB's are chained together in a singly linked list using the next BCB pointer field to point to a next BCB in the chain. When a BCB is added to or removed from the list, the next BCB pointer field is updated.

2. Data Bytes in Buffer: This field specifies the number of actual data bytes in the associated buffer.

3. Buffer Size: This field is initialized by software to indicate the extent (or size) of the allocated buffer.

4. Buffer Address: This field specifies the location of the buffer that is associated with the BCB in RAM 16.

5. Other Data: This field specifies other pertinent information associated with the BCB, but not directly relevant to this invention.

Ownership of a BCB determines a right to read/write the contents of the BCB and the associated buffer. When a BCB is created by software, the software owns the BCB. BCB's are generally created at power-on time, when the software is idle or, when a need for more BCB's arise. When software passes ownership of a BCB to hardware, the hardware is responsible for allocation of the BCB.

Processor 12 employs two "Orders" to enable handling of BCB's, i.e., a "get BCB" Order and a "free BCB" Order. The free BCB Order puts a BCB into a linked list (or chain) which defines a free buffer pool. The "get BCB" Order accesses a next BCB from the linked list and makes the buffer (within a free buffer pool) accessible to an executing procedure. All BCB's in the linked list (chain) define buffers of the same buffer size. Different free buffer pools are set up for different buffer sizes.

In FIG. 1, free buffer pool A is defined as to its structure by the BCB's that are contained within control RAM 18. More specifically, the "BCB chain (pool A)" defines the structure of free buffer pool A in data RAM 16 and further defines the size of each buffer within free buffer pool A. In similar fashion, the structures of free buffer pools B, C, and D are defined by BCB chains for pools B,C, and D, all resident within control RAM 18. The number of BCB's in each BCB chain defines the amount of memory available in a free buffer pool.

Associated with each BCB chain in control RAM 18 is a set of free pool registers 20, 22, . . . that respectively describe the current status of each free buffer pool. Thus, free buffer pool registers 20 define the state of "BCB chain (pool A)" and free pool registers 22 define the state of "BCB chain (pool B)", etc. Each set of free pool registers includes the following information:

1. Free BCB Pointer: This register points to the first available BCB in the associated BCB chain. Queue management hardware within processor 12 (not shown) maintains the BCB's in each BCB chain in a last-in-first-out queue. Thus, whenever a BCB is added to or removed from a BCB chain, the free BCB pointer and the next BCB pointer fields of the affected BCB's are updated.

2. BCB Counter: This register keeps track of the number of available BCB's in the associated BCB chain.

3. BCB Low Level: This register is initialized by software to indicate a low limit number of BCB's in the BCB chain, below which processor 12 will generate an interrupt to software so that the BCB chain can be replenished.

4. Buffer Size: This register specifies the size of each allocated buffer in the BCB chain.

As indicated above, an executing procedure requiring use of a buffer of a particular size issues a get BCB Order to processor 12 which, in turn, requests a BCB from a particular free buffer pool. If the requested buffer pool is not empty (as evidenced the state of its associated BCB chain), processor 12 removes a first-available BCB from the BCB chain, updates the affected registers and BCB fields, and passes the BCB to the requesting hardware. Thereafter, the hardware is enabled to utilize the buffer space defined by the BCB within the associated free buffer pool.

Thereafter, an executing procedure can return to the free buffer pool a BCB whose use is no longer required. This return is accomplished by issuing a "free BCB Order". Processor 12, in response, adds the freed BCB to the associated BCB chain, followed by an appropriate updating of relevant fields in the associated free pool register and the BCB, itself.

When an executing procedure requests an allocation of buffer space, the requested amount of buffer space may or may not be equal to a buffer size in a specific free buffer pool. Thus, the system of FIG. 1 contains a memory allocation procedure 24 to enable an efficient allocation of buffers to the requesting procedure. The principal objective implemented by memory allocation procedure 24 is to minimize an overall amount of buffer space that is allocated when utilizing the BCB's.

As indicated above, a commonly accepted prior art procedure is to compare the actual size of the requested buffer space to the buffer size in each free buffer pool. If the size of the needed buffer space is larger than the largest available buffer size in a free buffer pool, then the BCB with the largest buffer size is selected. Otherwise, the BCB with the buffer size that is just larger than the actual size of the buffer needed is selected. On average, only 50% of the buffer space available as a result of selection of the last BCB will be employed.

To avoid the wasted buffer space which arises through use of the prior art procedure, the system of FIG. 1 employs a buffer size selection criteria which employs a parameter "Selection size" associated with each free buffer pool. The Selection size parameter is related to the buffer size in each free buffer pool. The buffer size selection criteria procedure is shown in the logical flow diagram of FIG. 4 and thus differs for each free buffer pool. Use of the Selection size parameter enables the amount of fragmented buffer space to be minimized by modifying the buffer selection criteria so that if a last buffer required to satisfy a requested buffer space allocation is only partially used, then several smaller buffers are selected instead. In the embodiment to be described below, the Selection size parameter is such as to cause selection of smaller buffers when a last buffer is slightly more than half used. However, it is to be understood that the Selection size criteria can be set at any partial use level, depending upon the user's system.

The value of a Selection size parameter associated with a free buffer pool is chosen so that it is larger than the buffer size in the respective free buffer pool, but is less than the next larger buffer size available. Thus, assuming that free buffer pools A, B, C and D respectively contain buffers of 64 bytes, 128 bytes, 256 bytes and 512 bytes, Selection size(A) parameter for free buffer pool A is 96 bytes; Selection size(B) parameter is 192 bytes; Selection size(C) parameter is 384 bytes and Selection size(D) parameter is 768 bytes. It will be noted in this example that each Selection size parameter is the sum of the buffer size in the associated free buffer pool plus one-half of the buffer size in the next smaller buffer size free buffer pool. These Selection size parameters are provided for exemplary purposes and are not to be considered as limiting the invention. Each of the Selection size parameters (A), (B), (C), and (D) is stored in control RAM 18 in conjunction with memory allocation procedure 24.

During a buffer selection process in response to a buffer space allocation request, the requested buffer space is compared to the various Selection size parameters. If the size of the requested buffer space is larger than the largest available Selection size parameter, then a BCB associated with a largest buffer size is selected. Otherwise, a BCB having an associated Selection size parameter that is just larger than the actual size of the requested buffer space is selected.

When a particular buffer is selected from a free buffer pool, the amount of space used in the selected buffer can only be one of two possibilities. Either the entire buffer is used, or an amount is used that is larger than the next smaller Selection size parameter (which is always chosen to be at least as large as the next smaller buffer size). For instance, if the Selection size parameter is set to the average of the respective buffer size and a next larger buffer size, and the buffer sizes double in capacity for each next larger size buffer size, then the amount of space used in a selected buffer will be at least 75%. While this may not be so when the smallest buffer is chosen, the amount of wasted space is so limited in such an instance as to be of little consequence.

The Selection size parameter and its use may be illustrated by an example using the above given exemplary parameter sizes. Consider a requested buffer space of 300 bytes. If the procedure were to use buffer size as the selection criteria, then a 512 byte buffer would be selected, resulting in a waste of 212 bytes, representing a 41% waste. But, if the Selection size(C) parameter of 384 is employed, then a 256 byte buffer size is allocated from free buffer pool C. This selection leaves 44 remaining bytes of the requested space allocation to be fulfilled. Since no free buffer pool is available which includes 32 byte buffers, the Selection size(A) parameter of 96 is chosen which provides a 64-byte buffer, of which 20 bytes are wasted. The result is that a total of 320 bytes of buffer are used to satisfy a buffer space requirement of 300 bytes, resulting in a 6% waste.

It can thus be seen that the Selection size parameter enables significantly improved buffer allocation efficiency.

Under certain circumstances, a procedure executing in processor 12 will require a known fixed amount of memory. In such case, the procedure could request a buffer to be allocated from one of the free buffer pools, but this would require the use of a BCB and the time required to deal with the BCB and its data structure. To accommodate a request for a fixed, known amount of memory, further RAM storage areas 30 and 32 are provided which are subdivided into storage areas called "quickcells." Thus, quickcell RAM A includes 256 byte quickcells (for example) and quickcell RAM B includes quickcells of 512 bytes.

Figure 3:
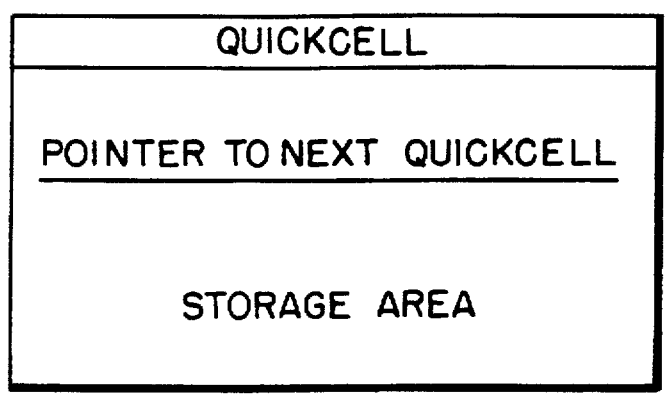
FIG. 3 is a diagram illustrating a quickcell data structure.

As shown in FIG. 3, a quickcell is a block of memory with no pre-defined fields except that it includes, as a first entry, a pointer to a next quickcell. A pair of registers 34 and 36 (see FIG. 1) maintain track of a next available quickcell in each of quickcell RAM A and quickcell RAM B, respectively. Quickcells are pre-allocated by software and are managed by queue management hardware functions within processor 12. While a quickcell is under possession of the queue management hardware, the pointer in the quickcell is used to specify the next quickcell in the pool and is maintained in either register 34 or 36, as the case may be. When a quickcell is released by the queue management hardware to the requester, the entire quickcell can be used for any purpose. Thus, a quickcell complements the BCB/free buffer pool structure by providing a buffer space allocation with no control structure overhead, if the size of the needed buffer is known in advance.

The above described allocation procedures exhibit the following advantages:

1. By pre-allocating the buffers and leaving the dynamic buffer allocation to hardware structures, the software overhead is removed from the critical path. Thus, both software and hardware performance is enhanced.
2. The control structure associated with a buffer allows multiple buffers to be linked together. This provides a flexible means for satisfying a buffer requirement, even if only a few buffer sizes are available. As hardware fills up one buffer, it requests another and chains the BCB's together in a linked list using the next BCB pointer field.

3. By using safeguards such as the BCB low level value, software can replenish the buffer pool at a convenient time before the pool becomes empty, without effecting system throughput.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A dynamic memory allocation procedure comprising the computer-implemented steps of:

a. allocating areas of memory for use as a series of free buffer pools, each free buffer pool comprising plural identical size (hereafter called "buffer size") buffer storage areas, each succeeding free buffer pool of said series including a larger buffer size than a preceding free buffer pool of said series;

b. associating a selection size parameter with each free buffer pool, said selection size parameter for a given free buffer pool being a value larger than said buffer size comprising said given free buffer pool, but less than a next larger buffer size comprising a further one of said series of free buffer pools; and c. responding to a request for allocation of buffer space by
      i. allocating a buffer from a free buffer pool whose selection size parameter is a larger value, among selection size parameters, than said buffer space that was requested;
      ii. determining a difference between and the allocated buffer size and the requested buffer space to find an unfulfilled amount of said requested buffer space; and
      iii. allocating a buffer from a free buffer pool whose selection size parameter is a larger value, among selection size parameters, than said unfulfilled amount; and
      iv. repeating steps ii and iii until step ii determines that no unfulfilled amount remains of said requested buffer space.

2. The method as recited in claim 1, wherein said buffer size of a free buffer pool is double a buffer size of a free buffer pool that just precedes in said series.

3. The method as recited in claim 1, wherein each said selection size parameter is the sum of the buffer size of the associated free buffer pool and the buffer size of a free buffer pool that just precedes in said series.

4. The method as recited in claim 1, wherein each buffer is provided with an associated buffer control block (BCB) data structure and each of steps (a)–(c) is performed employing a BCB, each BCB including a pointer to a next BCB, a buffer address and a size value of a buffer at said buffer address.

5. The method as recited in claim 1, wherein step (a) is performed in advance of receipt of a request for a buffer allocation.

6. The method as recited in claim 1, further comprising the step of:

d. for each free buffer pool, maintaining track of remaining unallocated buffer space and when a low level threshold of said unallocated buffer space is reached for a free buffer pool, allocating additional buffer space to said free buffer pool.

7. Apparatus for dynamically allocating memory, comprising:

a processor;

a free buffer pool memory;

control memory storing buffer control block (BCB) data structures which enable segmentation of said free buffer pool memory into a series of free buffer pools, each free buffer pool comprising plural buffers of identical size (hereafter called "buffer size"), each succeeding free buffer pool of said series including a larger buffer size than a preceding free buffer pool of said series;

memory means for storing a selection size parameter in association with each free buffer pool, said selection size parameter for a given free buffer pool being a value larger than said buffer size comprising said given free buffer pool, but less than a next larger buffer size comprising a further one of said series of free buffer pools; and a memory allocation procedure stored in said control memory and operational in combination with said processor, said BCB data structures and selection size parameters to respond to a request from an executing procedure for allocation of buffer space by:
      i. allocating a buffer from a free buffer pool in said free buffer pool memory whose associated selection size parameter is a larger value, among selection size parameters, than said buffer space that was requested;
      ii. determining a difference between the allocated buffer size and the requested buffer space to find an unfulfilled amount of said requested buffer space;
      iii. allocating a buffer from a free buffer pool in said free buffer pool memory whose selection size parameter is a larger value, among selection size parameters, than said unfulfilled amount; and
      iv. repeating ii and iii until said memory allocation procedure determines that there is no unfulfilled amount of said requested buffer space.

8. The apparatus as recited in claim 7, wherein each buffer is provided with an associated BCB data structure, each BCB including a pointer to a next BCB, a buffer address, a size value of a buffer at said buffer address, a plurality of said BCBs comprising a data structure which enables said segmentation of said free buffer pool memory.

9. The apparatus as recited in claim 8, further comprising:

means associated with each free buffer pool for enabling said processor to determine when non-allocated buffer space in said free buffer pool has reached a low level threshold so as to enable a replenishment of said buffer space.

10. The apparatus as recited in claim 7, further comprising:

a first quickcell memory having a storage capacity to store plural quickcells, each of said plural quickcells being an area of storage of identical size, each quickcell including a pointer to an address of a next linked quickcell;

a quickcell register indicating an address of a next unallocated quickcell in said first quickcell memory; and said memory allocation procedure responding to a memory allocation request, by (i) allocating said next unallocated quickcell in accord with said address stored in said quickcell register and (ii) updating said address in said quickcell register in accord with said pointer in a just allocated quickcell.

11. The apparatus as recited in claim 10, further comprising:

plural additional quickcell memories and associated quickcell registers, each additional quickcell memory having a storage capacity to store plural quickcells, each of said plural quickcells being an area of storage of identical size, each quickcell memory having a different size quickcell.

* * * * *